United States Patent [19]

Kikuchi et al.

[11] 3,878,509

[45] Apr. 15, 1975

[54] CHARACTER RECOGNITION SYSTEM

[75] Inventors: Yoshiyasu Kikuchi; Hiroaki Kawada; Takanori Yamaguchi; Tadashi Ito; Hideo Tsuiki, all of Tokyo, Japan

[73] Assignee: Nippon Electric Company, Limited, Tokyo, Japan

[22] Filed: Oct. 26, 1973

[21] Appl. No.: 410,126

[30] Foreign Application Priority Data

Oct. 27, 1972 Japan .............................. 47-107691

[52] U.S. Cl. .................. 340/146.3 H; 340/146.3 Q; 340/146.3 MA

[51] Int. Cl. ............................................ G06k 9/12

[58] Field of Search ............. 340/146.3 H, 146.3 Q, 340/146.3 MA

[56] References Cited

UNITED STATES PATENTS

| | | | |
|---|---|---|---|
| 3,234,513 | 2/1966 | Brust | 340/146.3 H |
| 3,522,585 | 8/1970 | Lemay | 340/146.3 H |
| 3,618,080 | 10/1971 | Angeloni et al. | 340/146.3 MA |
| 3,629,833 | 12/1971 | Demer | 340/146.3 H |
| 3,717,848 | 2/1973 | Irvin et al. | 340/146.3 Q |

*Primary Examiner*—Gareth D. Shaw
*Assistant Examiner*—Joseph M. Thesz, Jr.
*Attorney, Agent, or Firm*—Sughrue, Rothwell, Mion, Zinn & Macpeak

[57] ABSTRACT

In a character recognition system including a two-dimensional memory device adapted to store input character information for comparison with standard character matrices, the data in the memory device, i.e., a two-dimensional pattern of a character to be recognized, is shifted generally diagonally within the memory device so that a "best" comparison is made between the input and standard character matrices at a location where their centers are most closely aligned. The total number of non-coincident elements, i.e., that number of instances where statistically selected elements that are "black" in the standard character matrix are "white" in the unknown or input character matrix, and vice versa, is counted. This avoids the need for "weighting" the comparison points by comparing the total counts for each standard character matrix to determine the unknown character.

2 Claims, 15 Drawing Figures

CHARACTER RECOGNITION SYSTEM

BACKGROUND OF THE INVENTION

1. Field of the Invention

This invention relates to a character recognition system, and more particularly to a method and apparatus for automatically recognizing and identifying printed characters.

2. Description of the Prior Art

In conventional character recognition apparatuses it has been common to convert input character information into a serial binary code, and after storage of the code, to perform processing thereon to accomplish the recognition. In such cases, photoelectric conversion elements are disposed to sufficiently cover the vertical variations of character positions on the recording medium, and a memory device such as a shift register, having dimensions corresponding to the photoelectric conversion elements, must be provided.

Heretofore, techniques for normalizing the positions of characters of figures for the character recognition apparatus have been proposed. One of the normalizing techniques having a relatively simpler construction provides that the lower left end of an input character is set in coincidence with the lower left end of an input character matrix. With this technique, since the size of the memory device may be restricted to a zone approximately equal to the size of the input character, the capacity of the memory device can be greatly economized.

In normalizing the character positions according to this technique, however, several problems arise as follows. The stroke widths of characters printed by typewriters or line-printers vary widely with the possiblity of the center of an input character matrix after normalizing being shifted from that of a separately predetermined standard matrix for comparison.

Thus, a need exists for a recognition apparatus capable of reducing the capacity of the memory device for storing the input character matrices therein and yet, of preventing the degradation of the recognition capability despite variations in the stroke width.

Although various techniques for implementing character recognition have been proposed, most of the conventional structure using such techniques is very complicated and expensive. In a typical known system, a standard character matrix for each character and the "weights" to be multiplied by the individual elements of the matrix are predetermined, a comparison is made between the standard character matrix and the input character matrix as regards their individual elements to perform the additions or subtractions of the weights depending on the coincidence or non-coincidence, and finally, a decision is made as to which character is present based on the magnitude relationship of the total values for each standard character matrix. This type of recognition method can also be implemented by a resistive adding network. However, this type of recognition system has disadvantages in that the apparatus becomes very bulky and costly and all of adjustement, inspection, and maintenance services are very difficult and troublesome. A need thus exists for a recognition apparatus free from such disadvantages.

SUMMARY OF THE INVENTION

In accordance with this invention, there is provided a memory device for storing information and having an area covering a character to be recognized and a little larger than the character, and an input character matrix wherein the input character is caused to shift in a generally diagonal direction within a predetermined zone, e.g. in the upper and right directions, so that a comparison is made between the input and standard character matrices at a location where their centers are most nearly coincident with each other. This enables a more compact character recognition apparatus capable of sufficient covering the variations in stroke width of the characters.

Furthermore, the present invention is capable of identifying an input character by comparing the input character matrix with the standard character matrix and counting the non-coincident or inconsistent element numbers — that is, the number of instances where elments that should be black in the standard character matrix are found to be white in the input character matrix, and vice versa, and then comparing the magnitude relationship between the total counts for each standard character matrix. Since this avoids the need for weighting in the comparisons, as required by conventional apparatuses, the circuit structure of the recognition unit becomes much simpler and an improved character recognition apparatus can be obtained.

BRIEF DESCRIPTION OF THE DRAWINGS

The present invention will now be described in detail in conjunction with the accompanying drawings in which.

DESCRIPTION OF THE PREFERRED EMBODIMENTS

Figure 1:
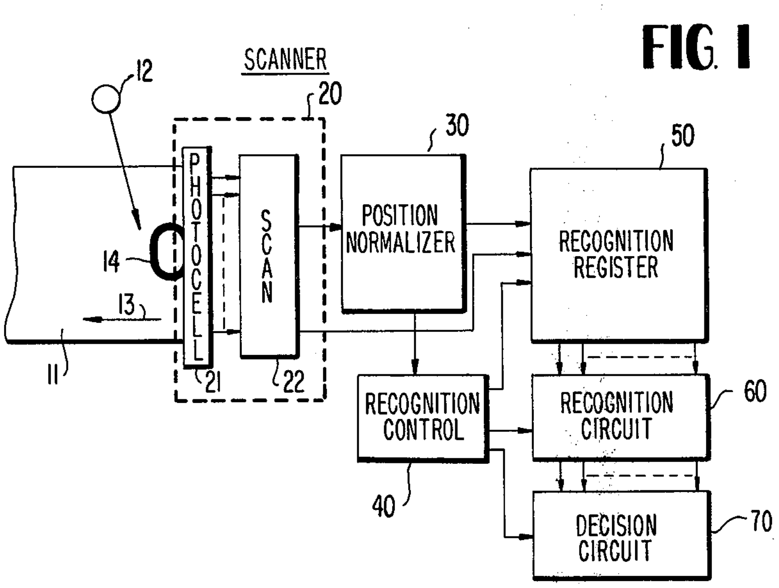
FIG. 1 shows a schematic block diagram of one embodiment of this invention.

In FIG. 1, which shows one embodiment of this invention, a character 14 printed on a document 11 is illuminated by light from a light source 12. The reflected light is scanned simultaneously in time by an array of photoelectric cells 21 disposed in a direction perpendicular to the direction of movement of the document 11, as shown by the arrow 13, to produce electrical signals of either level, that is, the level "0" corresponding to white or the level "1" corresponding to black, in response to the degree of brightness. It is assumed that the array of photocells 21 is sufficiently long to cover variations in the vertical positions of character patterns. A scanning circuit 22 provides a serially converted binary signal train by successively scanning the electric signals derived from the parallel outputs of photocells 21. The array of photocells 21 and the scanning circuit 22 will hereinafter be called a scanning device 20.

A position normalizing circuit 30 controls the clock shift signals of a recognition register 50 in order to have a portion of a character above the bottom end and to the right of the most left end enter thereinto out of the serial binary signals obtained from the scanning device 20. A known position normalizing circuit such as disclosed in Japanese Pat. publication No. 22732/1967, may be used in this invention. The recognition register 50 consists of shift registers so arranged as to convert a serially incoming binary signal train into a two-dimensional matrix corresponding to a character. A recognition control circuit 40 functions to generate a control signal for shifting a character matrix entering into the register 50 within a predetermined zone, a gate signal for performing the recognition within said zone, and a sawtooth wave signal for translating the recognized content into a time width signal. A recognition circuit 60 then observes the individual elements of an input character matrix at prescribed standard sampling points within the recognition register 50 and counts the number of non-coincident signal of each standard character matrix. Finally, a decision circuit 70 selects the least one of all non-coincidence numbers for each standard character matrix delivered from the recognition circuit 60 and produces a decision output indicating the character corresponding to the selected number.

Figure 2A:
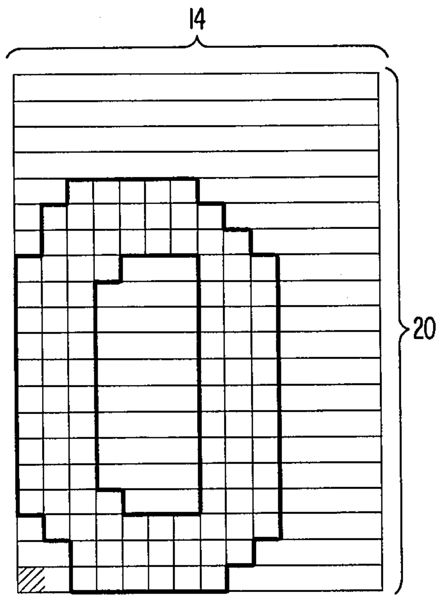
FIGS. 2(*a*) and 2(*b*) show diagrams illustrating the concept of character position normalizing exemplified by this invention and a shifting zone for an input character matrix after normalizing the character position.

In FIG. 2(a), which illustrates the concept of the character position normalizing, the alignment positions of the characters printed on the document 11 of FIG. 1 are usually subject to variation. The array of photocells 21 for the scanning device 20 comprises 40 elements in this embodiment and each scan line in the vertical direction of the document 11 is divided into 40 bits. The size of the character 14 in this case is from 14 to 16 bits, vertically, and from 9 to 11 bits, horizontally. Therefore, FIG. 2(a) shows a diagram indicating that an input character matrix of 20 bits by 14 bits size has been entered in the recognition register 50 and makes contact with the bottom and most left lines of the register 50 by means of the position control circuit 30 which uses a known character position normalizing technique (such as disclosed in Japanese Pat. publication No. 22732/1967) to control a clock shift signal of the register 50. Thus, conventional 40 bit recognition registers can be replaced by 20-bit registers according to this invention.

Figure 2B:
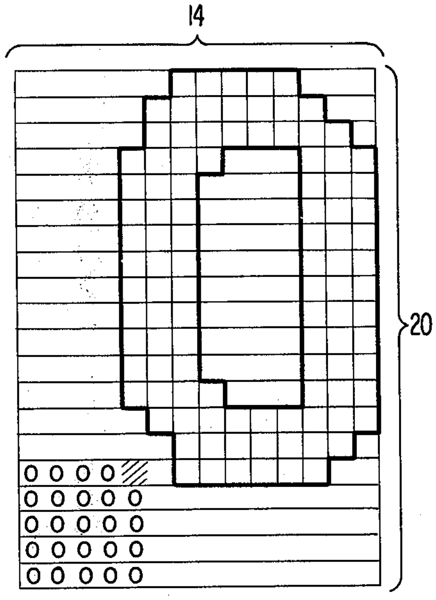

FIG. 2(*b*) illustrates the manner in which the input character matrix (shown in FIG. 2(*a*)) in the register 50 shifts 4 bits in both the upper and right directions. When a bit indicated by a graphical symbol ▨ in FIG. 2(*b*) is within the zone occupied by circles (O) (a square of 5-bit width by 5-bit width), the recognition circuit 60 becomes effective and performs the recognition.

Figure 3:
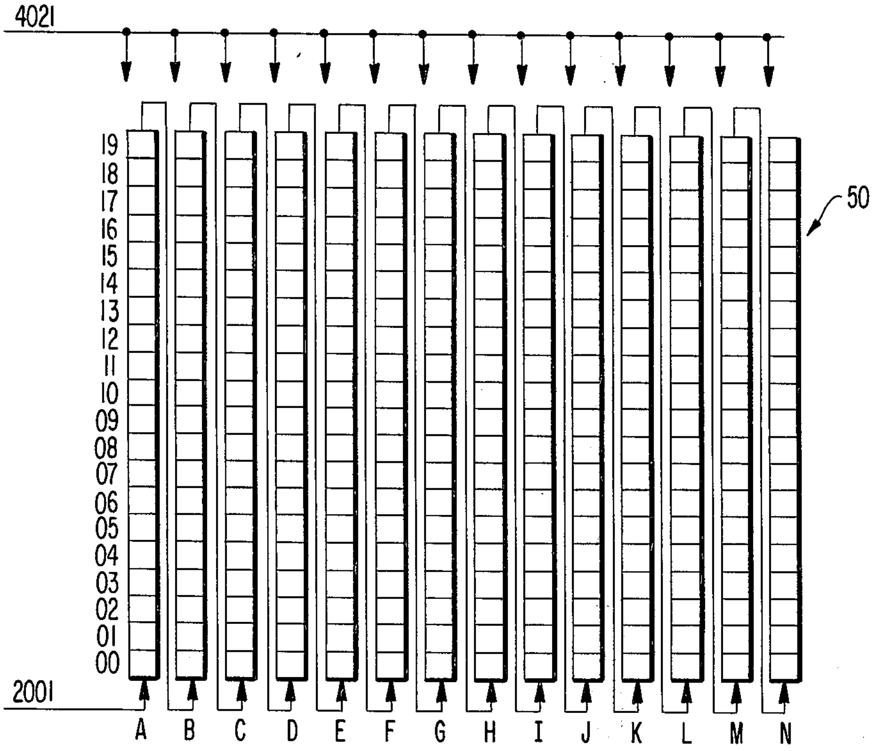
FIG. 3 shows a diagram of a recognition register.
Figure 4:
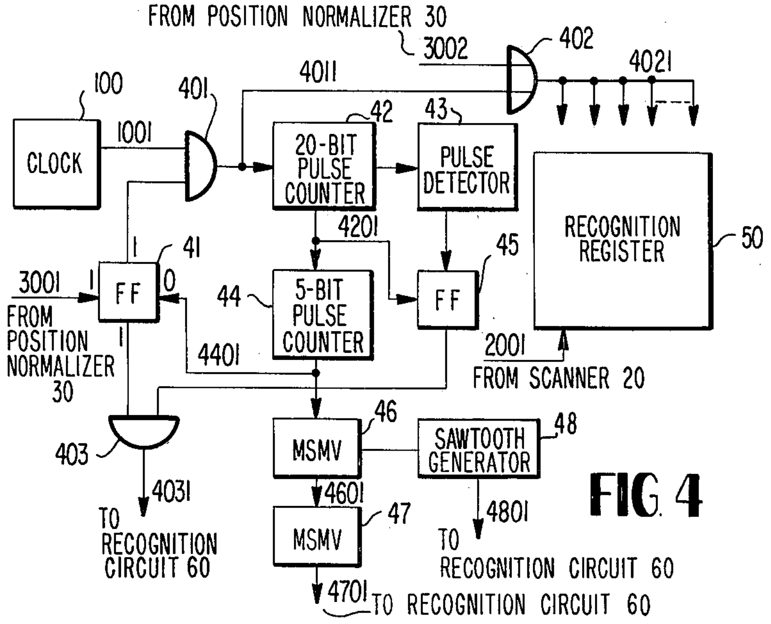
FIG. 4 shows a diagram of a recognition control circuit.

FIG. 3 shows the recognition register 50 composed of fourteen columns of serially connected shift registers, each column comprising a 20 bit register. A positive output and its inverted output are obtained for each bit. these outputs will be sequentially designated by A00, A01, A02, . . . A19; B00, B01, . . . B19; . . . N00, N01, . . . N19 and $\overline{\mathbf{A00}}$, $\overline{\mathbf{A01}}$, $\overline{\mathbf{A02}}$, . . . $\overline{\mathbf{B00}}$, $\overline{\mathbf{B01}}$, . . . $\overline{\mathbf{B19}}$; . . . $\overline{\mathbf{N00}}$, $\overline{\mathbf{N01}}$, $\overline{\mathbf{N19}}$. To the A00 bit position of the register 50 a serial binary signal 2001 is applied in succession, (FIG. 4). The serial binary signal is shifted in succession by a signal 4021 from the recognition control circuit 40. The input character matrix that has entered in the recognition register 50 moves by one bit in the upper direction each time one shift pulse 4021 is produced. Thus, the character pattern shifts in the right direction to the B00 bit position after 20 shift pulses.

In order to shift the input character matrix by 5 bits in the right direction, 20 × 5, or 100 shift pulses are needed.

In FIG. 4 which shows the recognition control circuit 40, the circuit 40 has the following functions:

(1) Production of shift clock pulses to be delivered to the register 50 in order to shift the input character matrix by 5 bits to the right within the register 50 as shown in FIG. 2(*b*); (2) Production of a gate signal for making the recognition circuit effective while the bit information designated by ▨ in FIG. 2(*b*) is in the 5 bit by 5 bit zone indicated by the circles (O); (3) Production of a sawtooth wave signal for translating the non-coincidence number obtained as a result of the recognition into a time width signal; and (4) Production of a signal indicating the termination of the recognition. A flip-flop 41 for controlling the character shifiting in the register 50 is set by a character normalizing end signal 3001 produced by the control circuit 30 at the instant the input character matrix has just entered in the recognition register 50 and is reset by an output pulse 4401 of a 5-pulse counter cirucit 44, which occurs when the recognition register is shifted by 100 bits. The output of the flip-flop 41 becomes an input to an AND gate 401 for shifting the recognition register and by use of this input signal, the AND gate 401 can deliver a clock signal 1001 from a clock generator 100 as an output signal 4011. The output signal 4011 is fed to the register 50 via an OR gate 402 for shifting the recognition register 50. To the other input of the OR gate 402 is a recognition register shift clock signal 3002 produced in the normalization process of the input character matrix by the position normalizing control circuit 30 for the recognition register 50, the clock signal being fed to the register 50 as the output signal 4021 of the OR gate 402. At the same time, the AND gate 401 for shifting the recognition register applies its output signal 4011 to a 20 bit pulse counting circuit 42. The 20 bit pulse counting circuit 42 may be of a conventional type such that the reset state varies in succession each time a pulse arrives at its input and the reset state is restored on arrival of the 20 th pulse with the production of a pulse at its output. The output pulse 4201 is fed to a 5 bit pulse counting circuit 44. Likewise, the circuit 44 is an ordinary counter such that an output pulse is produced on the arrival of the 5th input pulse as counted from the reset state for restoration to the reset state. The output pulse 4401 resets the flip-flop 41 for controlling the recognition register 50 and at the same time, triggers a monostable multivibrator 46 for sawtooth wave generation. A 5-pulse detecting circuit 43 produces an output pulse on detecting that the circuit 42 has reached the "5" state and the output pulse is fed to a recognition gate control flip-flop 45 to reset this flip-flop. The flip-flop 45 is so designed as to be set by a signal 4201 from the 20 bit pulse counting circuit 42 — that is, it assumes the 1 state during the time interval in which the content of the circuit 42 is 0 through 4 and the 0 state during the time interval in which the content is 5 through 19. An AND gate 403 for the recognition time control employs as its input pulse an output pulse from the flip-flop 45 and an output pulse from the recognition register shift control flip-flop 41. An output 4031 assumes the binary 1 state while the normalized input character matrix is within the zone, 5 bits (in the upper direction) by 5 bits (in the right direction). A monostable circuit 46 for sawtooth wave generation is triggered by a signal 4401 generated as soon as the 5 bit pulse counting circuit 44 has counted 5 pulses — that is, the input character matrix has shifted by 5 bits to the right within the register 50. Thus, the circuit 46 holds the 1 state for a constant time interval. An output signal from this monostable circuit 46 is applied to a sawtooth generator 48. The generator 48 is designed to deliver a signal 4801 of ordinary sawtooth waveform which decreases at a constant slope from an initial value (+5 volts in this emboidment) while the output of the monostable circuit 46 for sawtooth wave generation is in the 1 state, and returns to the initial value on restoration of the monostable circuit output to the 0 state. A monostable circuit 47 for generating a signal indicating the end of the recognition is a conventional monostable circuit which produces an output signal 4701 triggered at the trailing edge of an output 4601 of the monostable circuit 46 for the sawtooth wave generation, to maintain the 0 state for a constant time duration, and then to restore to the 1 state.

Figure 5:
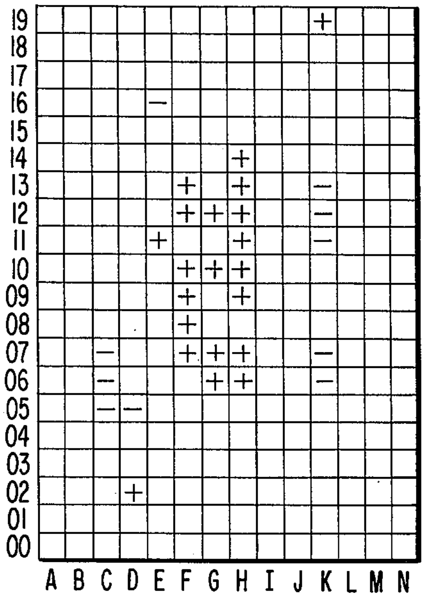
FIG. 5 shows a diagram for illustrating one example of standard character matrix points.

In FIG. 5, which illustrates one example of a standard character matrix for the character category 0 in the recognition apparatus of this invention, the sign (+) in the figure indicates that the positive output of a bit in the recognition register 50 should be 0 , whereas the sign (−) indicates that the inverted output should be 0.

Figures 6, 7, 8:
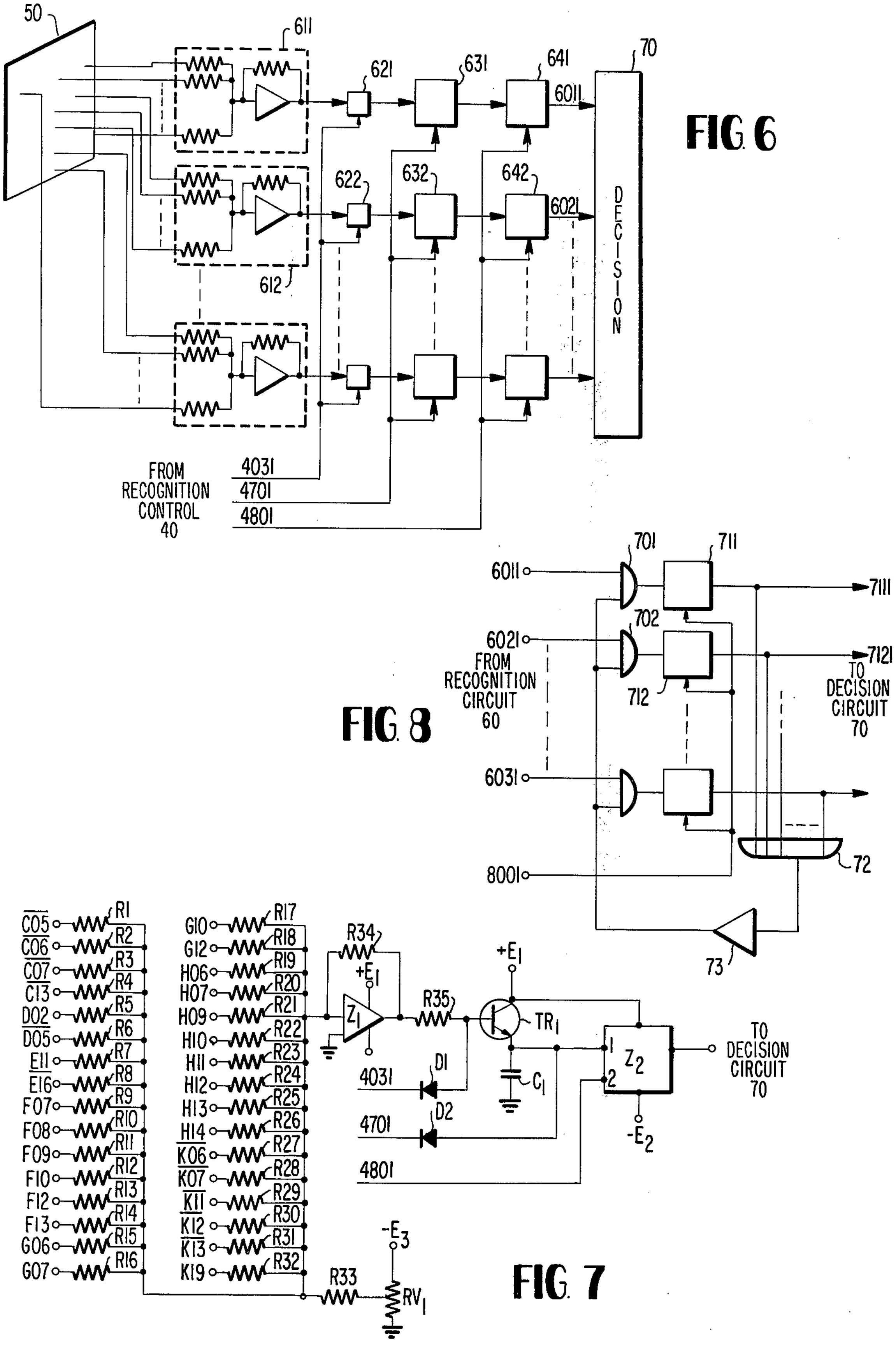
FIG. 6 shows a block diagram of a recognition circuit.
FIG. 7 illustrates the recognition circuit more in detail.
FIG. 8 shows a block diagram of a decision circuit.

In FIG. 6, which illustrates in block form the recognition circuit of this invention, the inputs of resistive adding circuits 611, 612, . . . for each character category are coupled to the corresponding points in a corresponding standard character matrix. All input resistors of the resistive adder circuits 611, 612, . . . should be set to the same resistance value so that the output levels may vary in proprotion to the input condition. The circuits 611, 612, . . . each should be so adjusted as to develop a maximum output voltage of constant value when all inputs are 0 — that is, the non-coincidence number is 0, said output voltage decreasing at a constant rate as the non-coincidence number increases. The output signals from the resistive adding circuits are fed respectively to peak value hold circuits 631, 632, . . . during the recognition time interval, in other words, when the ouptut signal 4031 of the AND circuit 403 in FIG. 4 is being transmitted to gates 621, 622, . . . . The output signals of these peak value hold circuits are respectively applied to time width converting circuits 641, 642, . . . . These circuits 641, 642, . . . . convert the outputs of the circuit 631, 632, . . . into time duration signals 6011, 6021, . . . proportional to the outputs. The highest one of all outputs supplied from the recognition circuits of each character category reaches the 1 state at the earliest time.

In FIG. 7, which illustrates in detail the recognition circuit for one example of the character category 0, the resistive adding network 611 of FIG. 6 comprises an operational amplifier having input resistors R1 through R32, a feedback resistor R34, a bias circuit consisting of a resistor R33 for setting the initial value, a variable resistor RV1, a (negative polarity) power source — E3, and an amplifier Z1. All input resistors R1 through R32 have the same resistance value and their input signals are positive outputs or the inverted outputs of the bits of the recognition register 50 corresponding to the standard character matrix for the character category 0 shown in FIG. 5. The input signals applied to the network 611 are at +5 volts and 0 volt respectively for the 1 and 0 outputs of the corresponding bits of the register 50. If an input character matrix in the register 50 coincides in all sampling points with the standard character matrix of the character category 0, all inputs to the resistive adding network are 0. The resistance value of the variable resistor RV1 in the bias circuit must be preset so that the output of the adding network 611 indicates a positive constant level $V_0$, or +4 volts according to this invention.

In the presence of only one non-coincident point in the input character pattern of all points corresponding to the standard character matrix, only one input to the network 611 becomes +5 volts and its output value decreases by an amount equal to $V_1 = 5 \times$ resistance value of R34/resistance value of R1 through R28

Then, the output level can be expressed as $V_0 - V_1$. Generally, the output level can be expressed as $V_0 - n \times V_1$ for non-coincidence number $n$, and the level decreases as n increases.

Referring again to FIG. 7, an analog gate 621 (FIG. 6) is composed of a diode $D_1$ and a resistor R35. To the cathode of the diode $D_1$ an AND gate output signal 4031 for recognition time use is applied, which is normally 0 volts, making the output voltage of the resistive adding network 611 0 volts through the diode $D_1$. As soon as the output signal reaches +5 volts during the recognition time, the diode $D_1$ is reverse biased and the output signal of the adding network is delivered to the next peak value hold circuit 631. The circuit 631 includes a transistor $TR_1$, a condenser $C_1$, and a diode $D_2$. When the output level of the adding network 611 is higher than the voltage held on the condenser $C_1$, the base voltage of the transistor $TR_1$ becomes higher than the emitter voltage with the result that the transistor is forward biased and conducts to follow the output signal of the adding network 611.

On the other hand, when the output level of the network 611 is lower than the voltage hold on the condenser $C_1$, the transistor $TR_1$ is reverse biased and hence, no current flows, with the result that the voltage on the condenser $C_1$ holds the same value as before. To the cathode of the diode $D_2$ is applied an output 4701 of the monostable circuit for generating a recognition end signal. This signal is normally maintained at +5 volts and the diode $D_2$ is reverse biased, but it becomes 0 volts for a constant time interval at the end of the recognition period. In this case, the diode $D_2$ is forward biased and the condenser $C_1$ is discharged to 0 volts.

In FIG. 7, an output signal of the peak value hold circuit 631 is fed to the time duration converting circuit 641 containing an analog comparator $Z_2$. The other input of the comparator $Z_2$ is an output signal 4801 of the sawtooth wave generator 48. The output signal 4801 has a sawtooth waveform decreasing at a constant slope from +5 volts. The comparator $Z_2$ is an ordinary analog comparator whose output is 1 when two analog signals are applied to the two input terminals and the output signal level of the peak value hold circuit 631 is greater than that of the sawtooth generator 48. The comparator $Z_2$ delivers an output signal 1 at the instant the level of an output signal from the peak value hold circuit has become greater than that of the sawtooth signal 4801. In other words, the duration of the comparator output signal at the 1 level is proportional to the output level of the peak value hold circuit.

In FIG. 8, output signals 6011, 6021, . . . of the recognition circuit 60 translated into time durations for each character category are used as one input of each of decision register set AND circuits 701, 702, . . . . The other input of the AND circuits 701, 702, . . . is the output of a polarity inverting circuit 73 for inverting the output of an OR gate 72 which is supplied with all of the outputs 7111, 7121, . . . of decision registers 711, 712, . . . . The decision registers 711, 712, . . . transfer the output signals 7111, 7121, as the decision contents set by the outputs of the AND circuits 701, 702, . . . to other devices or circuits. The decision registers 711, 712, . . . are reset by a decision end signal 8001.

The decision circuit of FIG. 8 operates as follows. Suppose that the output signal 6011 for the character 0 goes to the 1 state at the earliest time of all the output signals 6011, 6021, . . . from the recognition circuit. Then, the decision register 711 for the character 0 is set and the output of the OR gate 72 becomes 1, the output of the polarity inverting circuit 73 becomes 0, the AND circuits 702 . . . for setting the other decision registers are inhibited, and the remaining incoming output signals from the recognition circuit are not applied to the decision registers 712, . . . Accordingly, only output signal 7111 out of the signals indicating the decision contents 7111, 7121, . . . becomes 1 and it is decided that the input character matrix represents the character 0.

Now a brief explanation of another embodiment of this invention will be given. In the foregoing embodiment, the standard character matrix has been defined as the interconnection condition between the recognition register and the adding circuits, the non-coincident signal number between the input character matrix and the standard character matrix is derived in the form of the analog voltage values, and a decision of an input character is made from the magnitude of the voltage values.

In contrast, the present embodiment is concerned with a case where a standard character matrix is stored in a memory device and a decision is made by deriving the non-coincidence number in the form of a digital numerical value.

Figure 9:
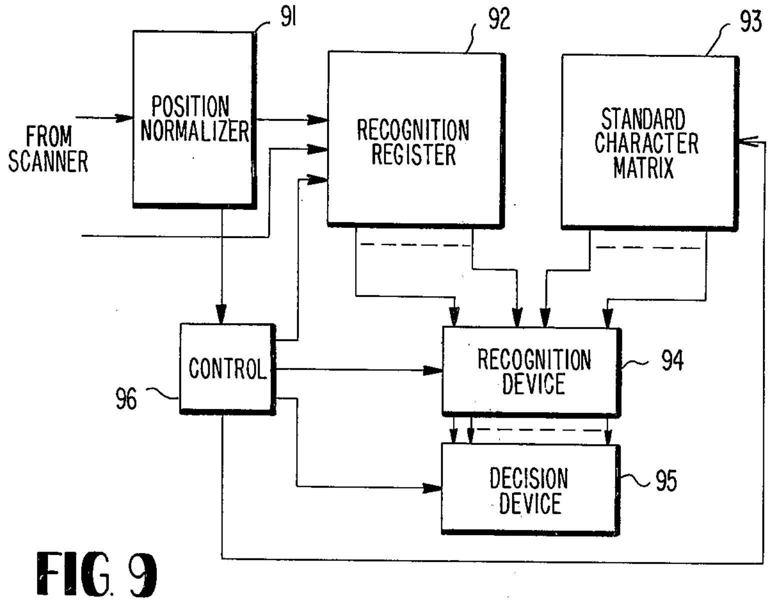
FIG. 9 shows a block diagram of a decision circuit according to another embodiment of this invention.

In FIG. 9, a position normalizing device 91 scans a character to be recognized and normalizes signals translated into the binary code as an input character matrix. A recognition register 92 is a memory device for memorizing the normalized input character matrix. At a recognition device 94, a comparison is made between the input character matrix read out from the recognition register 92 and a standard character matrix memory device 93 regarding the individual elements. The non-coincidence number thus derived is delivered to a next succeeding decision device 95, where a decision of the character is made. A control device 96 controls the foregoing process and produces various kinds of control signals, but no detailed description is necessary for this device.

Figure 10A:
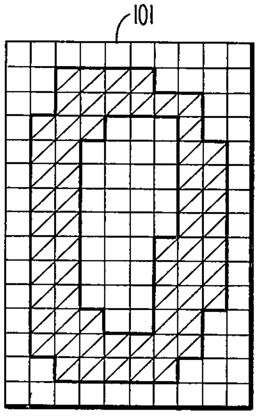
FIGS. 10(*a*), 10(*b*) and 10(*c*) illustrate pictorial representations of the memory state of an input character matrix and a corresponding standard character matrix.
Figure 10B:
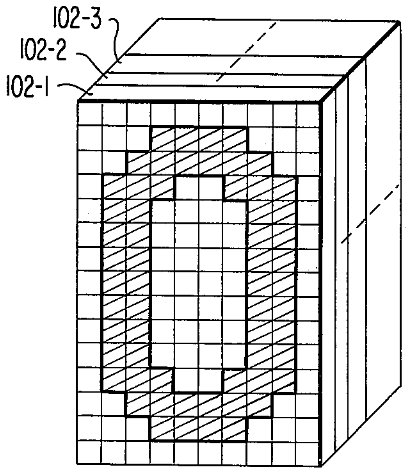
Figure 10C:
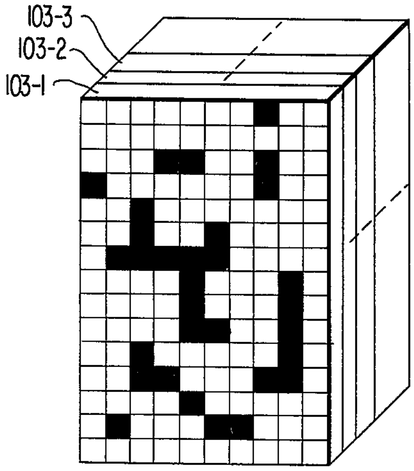

In FIG. 10(a), an input character matrix 101 memorized in the recognition register 92 illustrates a typical memory state for the input character 0. On the other hand, the standard character matrix memory device 93 is divided into two sections: a section 102 (FIG. 10(*b*)) for memorizing the average character matrix of the standard character matrix and a section 103 (FIG. 10(*c*)) for memorizing the sampling-point matrix of the standard character matrix. In the section 102 a number of average characters to be recognized are memorized, for instance, the characters 0, 1, and 2 in memory sections 102-1, 102-2, 102-3, respectively. In the sampling-point matrix memory section 103, all points necessary for recognizing characters are stored for each character. In a section 103-1, all sampling points to be used in recognizing the character 0 are memorized. Similarly, all sampling points for the character 1 are stored in a memory section 103-2. Accordingly, as will be obvious to those skilled in the art, to seek the non-coincidence number between the input and standard character matrices is equivalent to using exclusive OR logic between the input and average character matrices and then, implementing an "AND" function between the exclusive OR circuit output and the sampling-poing matrix output.

Figure 11:
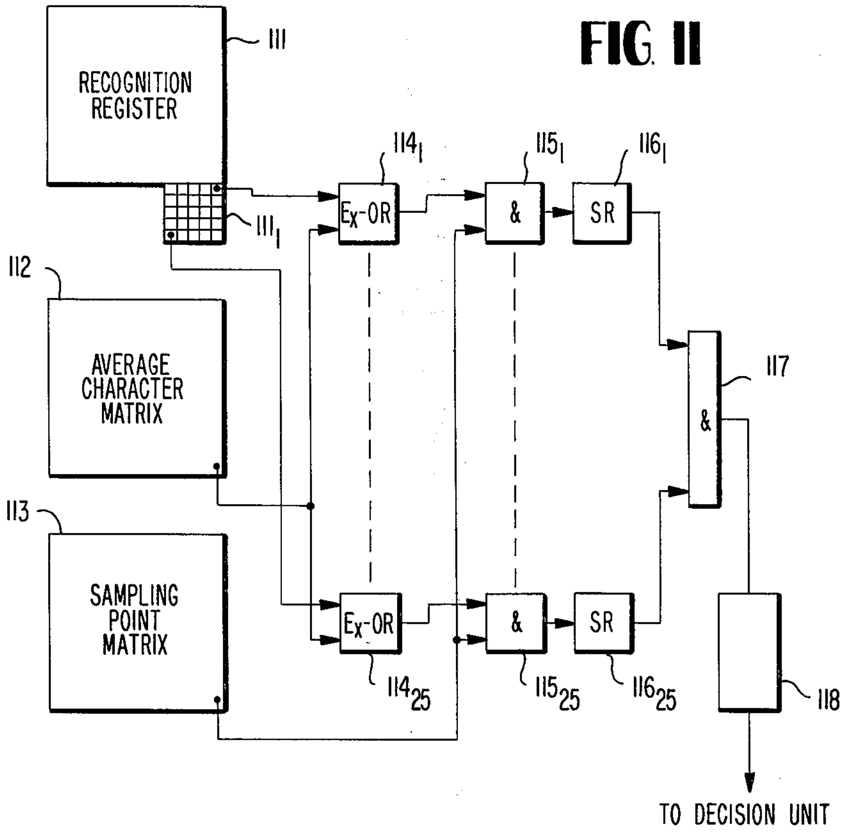
FIG. 11 shows a block diagram of the recognition circuit to perform comparison between the input character matrix and the standard character matrix.

FIG. 11, a recognition register 111 is assumed in the succeeding description to be capable of shifting the input character matrix within a shifting zone, 5 bits by 5 bits, horizontally and vertically. To the recognition register 111 is annexed a 5 bits by 5 bits shift register 111-1 for processing the input character matrix simultaneously and in parallel in 5 times 5 shifting positions. In other words, the 5 × 5 bits shift register 111-1 reads out in the 5 × 5 shifting zone, simultaneously, the input character matrix element for each element of the average character matrix. Therefore, each bit of the 5 × 5 bits register 111-1 corresponds to the 5 × 5 shifting positions of the input character matrix and the individual elements of the input character matrix are sequentially written in the shift register. The output of the 5 × 5 bits register is introduced into exclusive OR circuits $\mathbf{114}_1$ through $\mathbf{114}_{25}$ arranged in parallel. On the other hand, the average character matrix memory device transfers in synchronism with the recognition register the individual elements of the average character matrix to the exclusive OR circuit $\mathbf{114}_1$ through $\mathbf{114}_{25}$, one for each circuit. Consequently, the OR circuits $\mathbf{114}_1$ through $\mathbf{114}_{25}$ compare each element of the input character matrix due to the transfer of 5 × 5 bits for each element of the average character matrix, and give a binary 1 when the respective element values are different, and a binary 0 otherwise, to AND gates $\mathbf{115}_1$ through $\mathbf{115}_{25}$. Since to the AND gates $\mathbf{115}_1$ through $\mathbf{115}_{25}$, in the same manner as the average character matrix memory device, the individual elements of the sampling point matrix synchronized with the transfer of the recognition register are sequentially applied, the output signal is obtained by taking an AND between these inputs and the outputs of the exclusive OR circuits $114_1$ through $114_{25}$. Thus, the outputs of the AND gates $115_1$ through $115_{25}$ become 1 when there is a difference of value between the input character matrix and the average character matrix at the elements corresponding to a sampling point, and 0 if otherwise, or non-coincidence signals at an element of each matrix.

To shift registers $116_1$ through $116_{25}$, a non-coincidence signal at each shifting point of the input character matrix of the recognition register is fed and the non-coincidence number is stored therein. The registers $116_1$ through $116_{25}$ are filled up in succession, one by one, each time a non-coincidence signal appears at the AND gates $115_1$ through $115_{25}$. In other words, the shift registers are filled up by the same number as the non-coincidence number as a result of the comparisons for all elements of a character of the standard matrix. Upon termination of the comparison of the input character matrix with all elements of a character of the standard character matrix, the contents stored in the shift registers $116_1$ through $116_{25}$ are delivered in succession to an AND gate 117. The AND gate 117 generates an output signal if all contents sent from the shift registers $116_1$ through $116_{25}$ are non-coincidence signals. Therefore, the least non-coincidence value of all contents stored in the registers $116_1$ through $116_{25}$ is transferred to a reversible register 118. In like manner, the reversible register 118 detects the non-coincidence number due to comparison between the input character matrix and the next character of the standard character matrix to store the detected content therein. Upon the termination of storage of the content due to comparison with all characters of the standard character matrix, the next character decision process is carried out.

Figure 12:
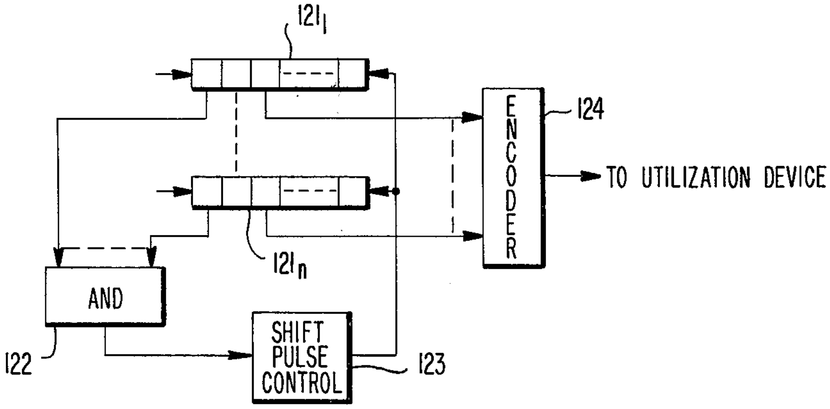
FIG. 12 shows a block diagram of the decision unit.

In FIG. 12, reversible shift registers $121_1$ through $121_n$ are contained in the register 118 shown in FIG. 11, and the number of shift registers corresponds to the number of standard character matrices. The outputs from the reversible shift registers $121_1$ through $121_n$ are derived in a direction reverse to that in which the non-coincidence signal is applied. If all bits derived are 1 or, a non-coincidence signal, the output from an AND gate 122 is 1, and as a result, a shift pulse control circuit 123 develops one shift pulse at its output. The shift pulse is delivered to the reversible shift registers, causing the stored content to shift by one step in the reverse direction or, to the left. This shifting operation terminates as soon as any one of the first bits stored in the reversible shift registers $121_1$ through $121_n$ becomes 0, and the character corresponding to that reversible shift register becomes a possible character for decision as the input character. It is also desirable that a certain limitation be imposed on the number of shift pulses occurring from the shift pulse control circuit 123. This restricts the non-coincidence number to become the possible decision output. It is assumed that the number of shift pulses is 2 for simplicity. Suppose that the third bit output, for example, as counted from the left of the reversible shift registers $121_1$ through $121_n$ is fed to an encoding circuit 124. This determines the condition satisfied by the difference between the least non-coincidence number and the next least non-coincicence number. Needless to say, the requested difference is 3.

From the foregoing description in most favorable cases, all inputs but one to the encoding circuit 124 become 1 and a character corresponding to 0 becomes the possible decision output.

The function of the encoding circuit for ultimately deciding the input character by taking other conditions into consideration, which is a conventional means, would not require a particular explanation herein.

While two typical embodiments of this invention, each concerned with a case where one standard character matrix corresponds to one character have been described above, it will be readily obvious to those skilled in the art that the present invention could easily be extended to a case where one character corresponds to a plurality of standard character matrices. This is achieved, referring to the second embodiment of this invention, by annexing in parallel one more circuit for the least non-coincidence number detection. Moreover, the photocell array used in the two embodiments of this invention may be replaced by a flying-spot scanner. Still further, the shifting zone for any of these embodiments has been assumed to be a $5 \times 5$ square, but it may be a rhombus or a cross. Furthermore, it has been assumed that the recognition processing takes place simultaneously in time and parallel in position, but this processing may be suitably divided into a plurality of processing steps. While a particular system of shifting the input character matrix has been described for each embodiment, another system of shifting the standard character matrix is well conceivable. Insofar as the input and standard character matrices can be displaced relatively from each other, any other suitable system could be used for this invention.

What is claimed is:

1. In a character recognition system including means for scanning an unknown character and for generating therefrom a serial train of binary signals representing black and white elements of the unknown character, a two-dimensional unknown character storage matrix defining in one corner thereof a comparison zone comprising a plurality of adjacent bit positions, means for loading the binary signal train into the matrix such that the outermost bits of the unknown character on two adjacent edges abut the adjacent edges of the matrix that meet at the corner where the comparison zone is defined, means for establishing a bit in the binary signal train representing the outermost corner of the unknown character dimensions at the intersection of said two adjacent edges, and a plurality of standard character matrices, the improvement comprising:

a. means for shifting the binary signal train, and thus the unknown character represented thereby, across the matrix in a generally diagonal direction toward the corner thereof opposite the comparison zone corner, and b. means for comparing the unknown character with each of the standard character matrices, during the shifting movement of the unknown character, each time the outermost corner representing bit coincides with a bit position in the comparison zone.

2. A system as defined in claim 1 wherein the comparing means comprises a plurality of resistive summing networks, one for each standard character matrix, each of said resistive summing networks including a plurality of equal valued resistors having their one ends connected to statistically predetermined elements of said unknown character storage matrix, which elements differ for each standard character, and their other ends connected together at common summing junctions, there being one such junction for each standard character, a plurality of peak value hold circuits individually associated with each standard character matrix, each of said peak value hold circuits being responsive to the output of an associated resistive summing network, and means for identifying the unknown character from the relative magnitudes of the signals stored in the peak value hold circuits at the termination of the shifting movement of the unknown character.

* * * * *